United States Patent
Robert et al.

(10) Patent No.: US 7,757,283 B2
(45) Date of Patent: Jul. 13, 2010

(54) SYSTEM AND METHOD FOR DETECTING ABNORMAL TRAFFIC BASED ON EARLY NOTIFICATION

(75) Inventors: Jean-Marc Robert, Ottawa (CA); Francois J. N. Cosquer, Kanata (CA)

(73) Assignee: Alcatel Lucent, Paris (FR)

( * ) Notice: Subject to any disclaimer, the term of this patent is extended or adjusted under 35 U.S.C. 154(b) by 1404 days.

(21) Appl. No.: 11/176,237

(22) Filed: Jul. 8, 2005

(65) Prior Publication Data

US 2007/0011741 A1    Jan. 11, 2007

(51) Int. Cl.
*G06F 11/00* (2006.01)
(52) U.S. Cl. ............................... 726/22; 726/3; 726/11
(58) Field of Classification Search ............. 726/22–25, 726/3, 11, 13
See application file for complete search history.

(56) References Cited

U.S. PATENT DOCUMENTS

| | | | |
|---|---|---|---|
| 6,321,338 B1 * | 11/2001 | Porras et al. ................... | 726/25 |
| 7,272,646 B2 * | 9/2007 | Cooper et al. ............... | 709/223 |
| 2003/0145232 A1 | 7/2003 | Poletto | |
| 2004/0093513 A1 | 5/2004 | Cantrell | |
| 2004/0103315 A1 * | 5/2004 | Cooper et al. ............... | 713/201 |
| 2004/0148520 A1 * | 7/2004 | Talpade et al. ............... | 713/201 |

FOREIGN PATENT DOCUMENTS

WO    WO 2004/015922    2/2004

OTHER PUBLICATIONS

Boudaoud K. et al: "An intelligent agent-based model for security management" Computers and Communications, 2002. Proceedings. ISCC 2002. Jul. 1-4, 2002.
Bace, R., et al., Intrusion Detection Systems, NIST Special Publication on Intrusion Detection System.
Dharmapurikar, S., et al., Deep Packet Inspection Using Parallel Bloom Filters, IEEE Computer Society, 2004.
Abad, C., et al., Correlation Between NetFlow System and Network Views for Intrusion Detection.

\* cited by examiner

*Primary Examiner*—Kimyen Vu
*Assistant Examiner*—John B King
(74) *Attorney, Agent, or Firm*—Kramer & Amado P.C.

(57) ABSTRACT

This method and system for detecting abnormal traffic in a communications network is based on classifying the traffic in risk and status categories and maintaining a service status table with this information for each service at a respective node. The risk categories are initially established based on known software vulnerabilities recognized for the respective service. An early notifier enables further processing of services suspected of malware propagation. Status categories enable segregating the traffic with a "under attack status" from the "non under attack" status, so that the intrusion detection system at the respective node only processes the "under attack" traffic. In this way, the time and amount of processing performed by the intrusion detection system is considerably reduced.

13 Claims, 3 Drawing Sheets

SYSTEM AND METHOD FOR DETECTING ABNORMAL TRAFFIC BASED ON EARLY NOTIFICATION

FIELD OF THE INVENTION

The invention is directed to communication networks and in particular to a method and a system for detecting abnormal traffic based on early notification.

BACKGROUND OF THE INVENTION

Global-based communications networks such as the Internet have evolved from an early, research-based system with limited access, to a truly world wide network with millions of users. The original network protocol, TCP/IP, was designed on the basis that system users would connect to the network for strictly legitimate purposes. As a consequence, no particular consideration was given to security issues. In recent years, however, the incidence of malicious attacks on the Internet has grown to an alarming proportion. Due to its anonymous nature, the Internet Protocol (IP) makes it extremely difficult to precisely identify the real source of any given datagram, and thus any given flow, if the source wishes to remain unknown. These attacks take on a variety of forms, and often lead to a complete disruption of service for a targeted victim.

The propagation of malware (software designed specifically to damage a system such as flooding, worms and viruses) can be very disruptive in distributed networks. Even though the impact of a worm or a virus on any given equipment (e.g. computer, server, router) is very often benign, the cumulative effects of tens of thousands of infected equipment spreading as fast as possible the malware to other equipments can be disastrous. In such cases, the networks may cease to provide efficiently their services to their users due to congestion.

One such attack is based on the concept of flooding a victim with so much traffic that the victim's server cannot cope, or with very effective malicious packets at lower rates. Other ways of denying service to a network user are viruses. A computer virus is a program or programming code that replicates itself across a network in various ways. A virus can be viewed as DoS (denial of service) attack where the victim is not usually specifically targeted, but simply a host unlucky enough to get the virus. Depending on the particular virus, the denial of service can be hardly noticeable ranging all the way through disastrous.

A virus that replicates itself by resending itself as an e-mail attachment or as part of a network message is known as a worm; they are generally noticed only when their uncontrolled replication consumes system resources, slowing or halting other tasks. The worms operate by exploiting both known and previously unknown software vulnerabilities in applications and systems software and propagate rapidly across the network. By hijacking trusted applications such as web servers, mail transfer agents and log-in servers, which typically run with many global permission, worms can gain full access to system resources, and cause complete system compromise.

The capacity to detect as fast as possible the propagation of malware and to react efficiently to on-going attacks inside the network in order to protect the network infrastructure is becoming a real challenge for network operators. This is particularly relevant for large distributed networks. In such networks, the network equipment (routers, switches) that constitutes the infrastructure must play an important role in limiting the propagation of malware. To protect their network and systems today, enterprises deploy a layered defense model, which includes firewalls, anti-virus systems, access management and intrusion detections systems (IDS). Defense models have been around for years, and yet to date none have been able to deliver on the final goal of providing full protection against all attacks with little associated cost and annoyance.

For example, a paper entitled "Intrusion Detection System" by Rebecca Bace and Peter Mell, dated November 2001 and available on *NIST Special Publication* website as SP-800-31, describes the current status of the IDS. Some of the techniques described in this paper have been designed specifically for detecting malware propagation in telecommunication networks infrastructure. They can be divided into two main categories: Flow-based analysis and Deep-packet analysis. Flow-based analysis includes methods for tracking malicious continuous flows of IP packets by analyzing the traffic flows in the telecommunication infrastructure to detect unusual patterns. It relies usually on technologies as Netflow, IPFix, and RTFM implemented into routers. An example of such a technology is described in the paper entitled "Correlation Between NetFlow System and Network Views for Intrusion Detection" by C. Abad et al. published in Workshop on Link Analysis, Counter-terrorism, and Privacy, April 2004. The Deep-packet analysis methodology includes the methods for tracking back single malicious IP packets by analyzing each packet to detect either known signatures or frequently seen patterns. An example of such a technology is described in the paper entitled "Deep Packet Inspection Using Parallel Bloom Filters", by S. Dharmapurikar et al. in IEEE Micro January 2004. Some of the methods for tracking continuous flows may also be used to track-back single packets, such as for example the iTrace method referred to above. However, the price to pay is overwhelming.

The solutions available so far do not detect and stop DoS attacks fast enough, and are expensive. Responsiveness is impacted by the fact that the current IDSs are based on multiple components: routers, firewalls, intrusion/anomaly detection systems. Under critical conditions, these systems may have problems to communicate and coordinate the required counter-measures. Monitoring and analysis of all packets going through high-end routers is impossible with current technology without introducing packet delays and losses, impacting on the effectiveness of the respective IDS. Monitoring and analysis all packets going through high-end routers requires specialized hardware or additional equipment coupled with the routers, increasing the complexity and the cost of the infrastructure. Even so, it may still have effectiveness problems.

Generic in-line Intrusion Prevention Systems (IPS) also rely on signatures and flows measurements to detect and block malicious activities in a network, hence their capabilities are limited in blocking zero-day worms. Moreover, if their detection algorithm is based on statistical observations (e.g. flow's bandwidth, number of active ports per host, etc.) it may take some time before an IPS system can start blocking a worm. Due to this window of time, an enterprise could be held accountable for the spreading of the worm. Also, signature and behavior monitoring technologies are not effective the first time a new worm spreads across the Internet, since it is not feasible to setup a policy that recognizes the malicious software until the attack happens. Signatures and policies can be updated periodically, but only after a worm or other malicious software has been recognized and studied. Signature monitoring technologies are not effective the first time a new worm spreads across the Internet. It is also extremely difficult to distinguish between the identity or behavior of 'good' and 'bad' code. This results in a large number of 'false positives' that limit the purpose of many prevention systems to detecting events rather than protecting against them.

Furthermore, both signature and behavior monitoring techniques allow a time interval between the onset of an attack and its detection, so that by monitoring the behavior of a running application, by the time the destructive behavior is detected, the application is already compromised and the malicious code is already running. This time interval represents a window of vulnerability for a network operating over the attacked access link.

In addition, firewalls cannot stop everything; they are configured to allow certain classes or types of data to pass through into the protected network. Every malicious activity that exploits a service allowed through a firewall will successfully spread. As a result, firewalls may no longer be sufficient to protect a corporate network from viruses, system penetration, spoofing, data and network sabotage, and denial of service attacks that exploit vulnerabilities in protocols allowed by a firewall.

The reliability and security of an IP network is essential in a world where computer networks are a key element in intra-entity and inter-entity communications and transactions. The actual IDS technology does not give the appropriate performance level required for high-end routers. To address this problem, new techniques are being currently devised. This is a key challenge for the telecom industry and many partial solutions have been proposed so far. Therefore, there is a need to provide a system for confining and detecting malicious activities (e.g. internet worms) in a network that is easy to install and maintain.

SUMMARY OF THE INVENTION

It is an object of the invention to provide a method and a system for detecting abnormal traffic based on early notification.

Accordingly, the invention provides for a method of detecting abnormal traffic at a node of a communications network equipped with an IDS/IPS, comprising the steps of: monitoring the status of a traffic flow input to the node to establish if the traffic flow carries suspicious data traffic, by looking only at a significant subset of data traffic in the traffic flow; and triggering an early notification once the status of the traffic flow is suspicious and flagging the traffic flow as a suspicious traffic flow.

The invention is more specifically directed to a method of detecting abnormal traffic at a network node of a communication network equipped with an intrusion detection/prevention system (IDS/IPS). The method comprises the steps of: a) maintaining a service status table with the status for each traffic flow input to the network node; b) evaluating the status of a traffic flow as "suspicious" or "non-suspicious" based on a risk class assigned to the respective traffic flow; c) updating the service status table whenever the status of the traffic flow changes form a "non-suspicious" state to a "suspicious" state and flagging the traffic flow as a suspicious traffic flow; d) further evaluating the status of the suspicious traffic flow to identify an "under attack" status or a "not under attack" status; e) further updating the status of the suspicious traffic flow to an "under attack" status, and flagging the suspicious traffic flow as a under attack traffic flow; and f) routing the under attack traffic flow to the IDS/IPS.

According to a further aspect, the invention provides a system for abnormal traffic detection with early notification (ATDEN) comprising: service status means for maintaining a service status table with the service status for each traffic flow input to a communication node; a monitor for evaluating the status of a traffic flow and updating the service status table whenever the status of the traffic flow changes; a traffic discriminator (18) for routing the traffic flow to the output of the system, to the monitor if the traffic flow has a "suspicious" state and to an intrusion detection/prevention system (IDS/IPS), if the traffic flow has an "under attack" status.

As indicated above, the IDS technology is a key challenge for the telecom industry. Advantageously, the method of the invention takes a targeted approach to traffic analysis and attack mitigating actions, thereby enhancing the performance of the network.

Another advantage of the invention is that it reduces importantly the amount of traffic to be processed for malware detection, so that the finding that a particular traffic is under attack is faster than in the existing systems. When combined with the existing IDSs/IPSs, the capacity to detect and react efficiently to a large variety of attack is importantly increased.

Still further, since only a fragment of the traffic is analyzed by the system according to the invention, hardware and computing time of the system of the invention is used more efficiently than in the previous solutions.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

The system of the invention is installed at nodes equipped with conventional intrusion detection system (IDS) or intrusion prevention system (IPS) technology; and is particularly efficient in the customer equipment (CE) and border router applications. However, any routers may benefit from this approach at different extend.

The invention proposes an early notification mechanism that enables fast identification of "suspicious" traffic using known characteristics of malware attacks. In addition, the system of the invention triggers the costly operation of the IDS/IPS only for a fraction of the traffic going through the network node, with a view to ease the integration of the IDS/IPS technology into high-end routers.

Figure 1:
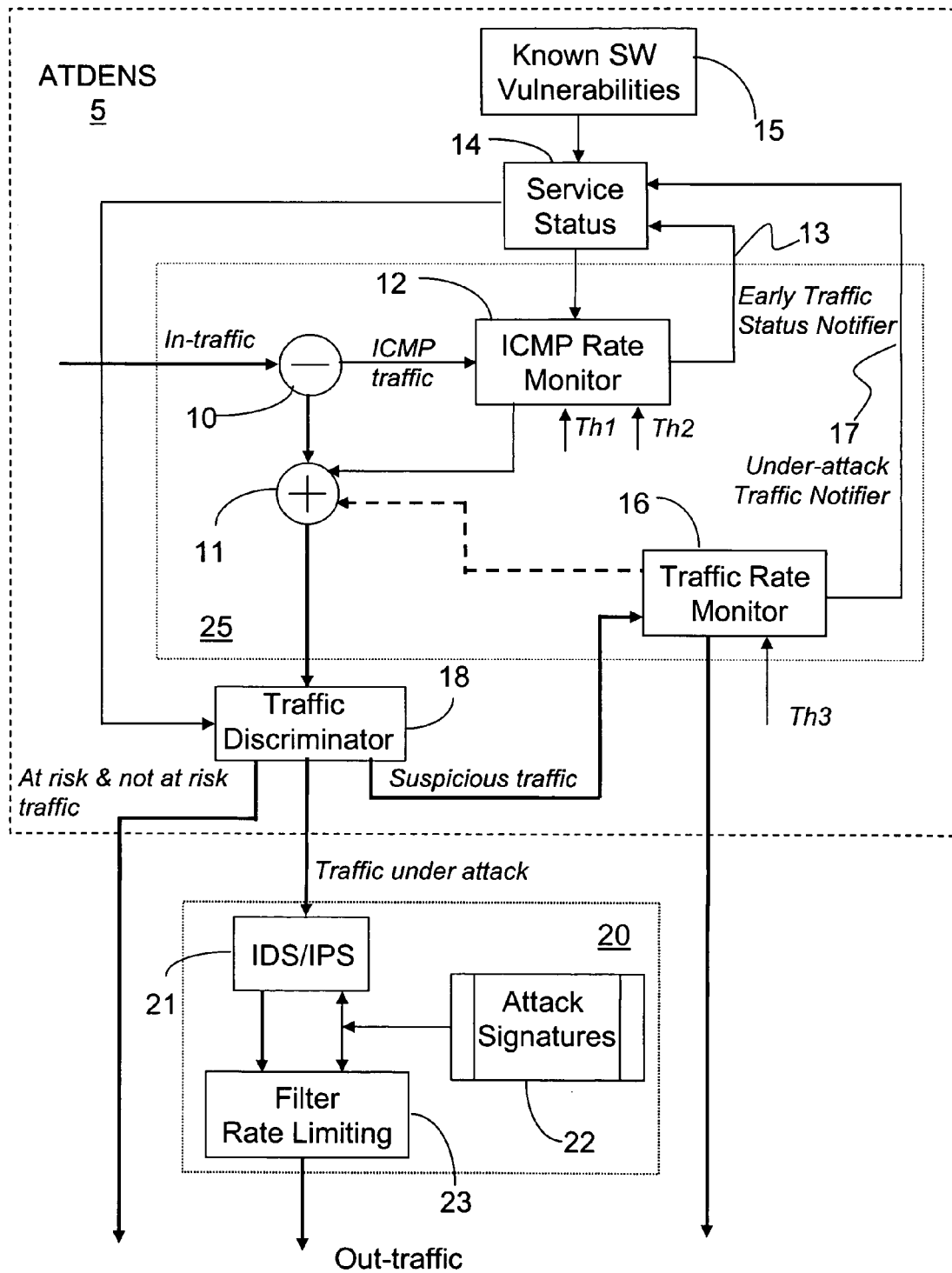
FIG. 1 is a block diagram of the system for abnormal traffic detection with early notification (ATDEN) according to an embodiment of the invention.

FIG. 1 illustrates a block diagram of the system for abnormal traffic detection based on early notification (ATDEN) according to the invention, denoted with reference numeral 5. The ATDEN system 5 comprises a service status unit 14 which maintains a status service table with the status for each traffic flow (service) input to the host node (router, CE), a monitor 25 for establishing the service status of each traffic flow and updating the status service table accordingly, and a traffic discriminator 18 for routing the input traffic flows to the output, to monitor 25, or to an intrusion detection/prevention block 20. The discriminator performs the routing based on the service status: the traffic with a "suspicious" status undergoes further monitoring, and the traffic with an "under attack" status, undergoes a mitigating action in block 20.

System 5 also uses means 15 for classifying the services (TCP/UDP ports) into service classes based on software vulnerabilities recognized for the protocol used by the respective traffic flow. Preferably, two classes of service are recognized, namely an "at risk" and a "not at risk" class.

The service status table of unit 14 includes service information for the ports/services of interest, which is initialized at boot using the information provided by unit 15. The table includes at the minimum the port identification, the respective protocols used by the traffic, the class of the service (at risk or not) and the current status of the respective service. It is to be noted that in the case that a port supports more than one service, the status of each respective service is listed in the table. The table may of course include additional information collected during operation of ATDEN system 5, such as entries for each time a service/port has been under attack, or carried suspicious traffic, the date and time of the respective change in the service status, etc. A dynamic table may also be used, in which case it updates itself if over-flown. Also, a Hash table may be used for more sophisticated systems.

Detection of the traffic under attack is made in two distinct stages. During the first stage, monitor 25 detects the first signs of malware propagation by looking only at a significant subset of the traffic for each service. The status of each traffic flow is then updated or not to "suspicious", if signs of malware propagation are detected. Once a traffic flow receives a "suspicious" status, an early notification 13 is triggered to the service status unit 14, which controls accordingly the traffic discriminator 18 to route back the "suspicious" traffic to the monitor 25 for further assessment of the status of that service. Since only a part of the traffic is monitored during this stage, the early notification 13 is triggered faster than if all packets in the traffic flow were monitored.

Preferably, monitor 25 uses in the first stage the ICMP packets as the subset of the traffic. ICMP stands for the Internet Control Message Protocol, and is used to send control messages between routers and hosts. For example, an ICMP packet may be sent when a router is experiencing congestion or when a destination host is unavailable. An ICMP packet has a slightly different structure than a data packet (packet with information), in that the ICMP header follows the IP header, but it is not considered to be a Layer 4 header. The ICMP message is provided in the Type and the Code fields, whose numeric values represent a specific ICMP message. Every vendor's implementation of IP is required to include ICMP.

Monitor 25 includes an ICMP rate monitor 12 which receives the ICMP packets separated at unit 10 from the data traffic. ICMP rate monitor 12 uses two different thresholds to classify the traffic flows as "suspicious" or not, according to the service class. For example, the threshold for the "at risk" traffic could be Th1 and the threshold for the "not at risk" traffic could be Th2. Preferably, Th1 is lower than Th2, since the security requirements for the "at risk" traffic are higher than those for the "not at risk" traffic. It is also to be noted that more thresholds may be used if there is necessary to assess more than two levels of "suspicious" traffic states, and different thresholds may be used for different traffic flows, according to the respective transmission protocol. Once any of the thresholds is violated by the ICMP rate in the respective traffic flow, the ICMP rate monitor issues the "early traffic status notifier" 13 indicating that the respective traffic flow is suspicious. As seen at 11, the ICMP traffic is re-inserted in the data traffic.

The result of the first stage is that service status unit 14 updates the port service status in the service status table and advises traffic discriminator 18 of which port(s) carry "suspicious traffic". As seen in FIG. 1, the traffic discriminator 18 routes the non-suspicious traffic (the "at risk" and "not at risk" traffic that is not tagged as "suspicious traffic" by the ICMP monitor 12) from the input to the output of the system 5.

In the second stage, a specified traffic parameter is monitored to further identify if the respective service is under attack or not. Preferably, the parameter is the traffic rate, but other types of monitoring at this stage may be used. In the embodiment of FIG. 1, the traffic discriminator 18 routes the traffic tagged by the service status unit 14 as "suspicious" to a traffic rate monitor 16. The traffic rate monitor 16 measures the rate of the traffic for the suspicious service(s) to detect if it is over a third threshold Th3, and redirects the "suspicious" traffic to the output. Alternatively, the suspicious traffic may be routed back to the input of the traffic discriminator 18 (shown in dotted line of FIG. 1); this alternative embodiment will ensure that no malicious packets arrive on the output in the interval until the status of the respective traffic flow eventually changes from "suspicious" to "under attack".

If the traffic rate crosses Th3, the traffic rate monitor 16 generates an "under-attack traffic notifier" 17 to service status unit 14, which updates this information in the service status table. In turn, unit 14 advises the traffic discriminator 18 that the suspicious traffic monitored is in fact under attack. Advantageously, since only the suspicious traffic is monitored in this stage, the time needed for determining if the traffic is under attack or not is relatively fast, and the traffic on the non-suspicious services is not affected at all.

The "under attack" traffic is then routed from the traffic discriminator 18 to intrusion detection/prevention block 20. Block 20 includes an intrusion detections system (IDS) and/or an intrusion prevention system (IPS) 21, which determines the type of attack based on attack signatures 22 collected from known worms, viruses, or based on abnormal behavioral signatures, etc. Once the attack is specified, block 20 attempts to mitigate its impact by using traditional filtering mechanisms 23. In this way, system 5 triggers the costly IDS/IPS technology only for a fraction of the traffic going through the router, thereby importantly reducing the processing resources and operating time of block 20.

Figure 2:
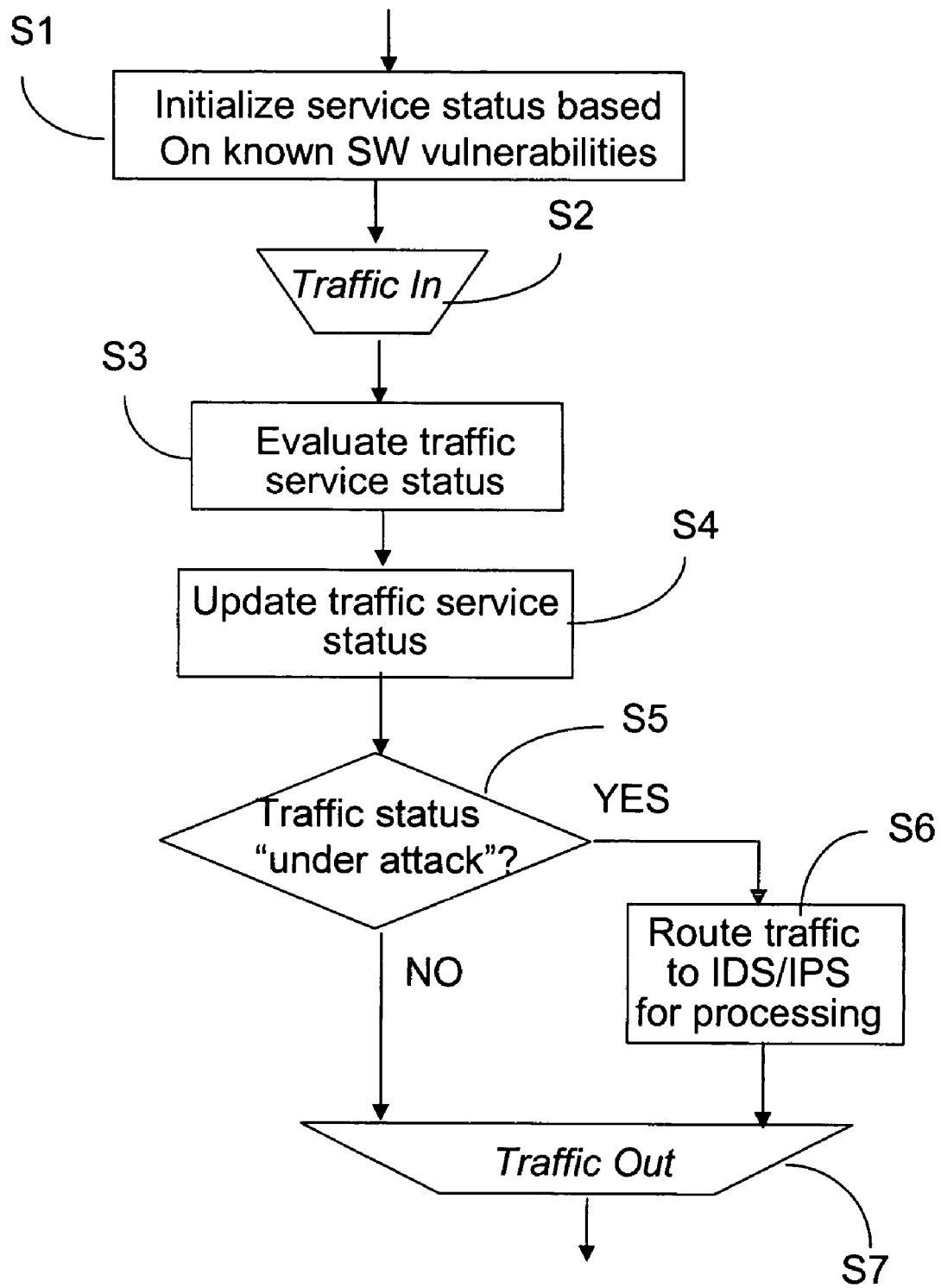
FIG. 2 is a flowchart of the method of operation of the ATDEN system showing how only a fraction of the traffic undergoes intrusion detection/prevention processing.

FIG. 2 illustrates a block diagram of the method of operation of the ATDEN system showing how only a fraction of the input traffic goes through the intrusion detection/prevention block 20. In step S1, the service status table is initialized based on known SW vulnerabilities for each service. At this stage, the ports/services are classified into an "at risk" class and "not at risk" class. Then, once traffic is received at the input of the respective host router or CE, step S2, monitor 25 determines the service status of the respective traffic flow, as shown in step S3. This is done in the two stages described above, according to the traffic class.

Next, monitor 25 updates the status of each traffic flow to reflect the current status, as shown in step S4. Based on the status information received from the service status unit 14, discriminator 18 isolates the "under attack" traffic and routes it to intrusion detection/prevention block 20 for processing, as shown by branch "YES" of decision block S5. The traffic with a status "not under attack" is routed to the output, as shown by branch "NO" of decision block S5. Intrusion detection/prevention block 20 specifies the attack against various attack signatures 22, and attempts to mitigate the impact of the attack using filtering mechanisms 23, step S6. The traffic is then routed to the output, or discarded is correction is not possible. To summarize, FIG. 2 illustrates how system 5 triggers the operation of block 20 only for a selected part of the traffic going through the router.

Figure 3A:
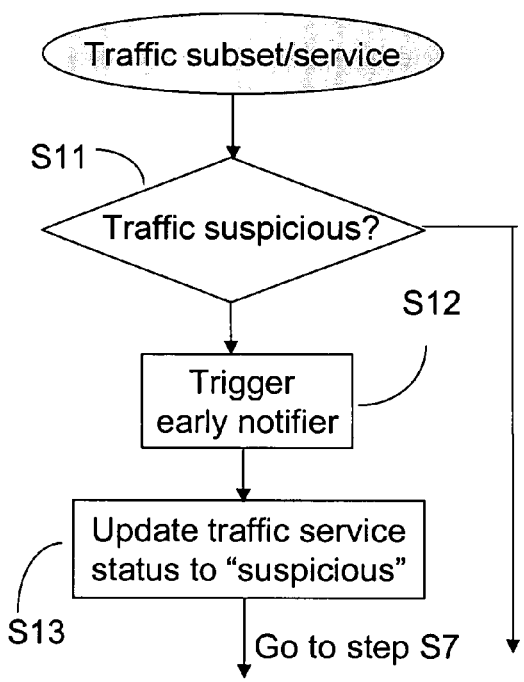
FIGS. 3a and 3b are flowcharts illustrating respectively the first and the second stage for evaluation the service status of the traffic.
Figure 3B:
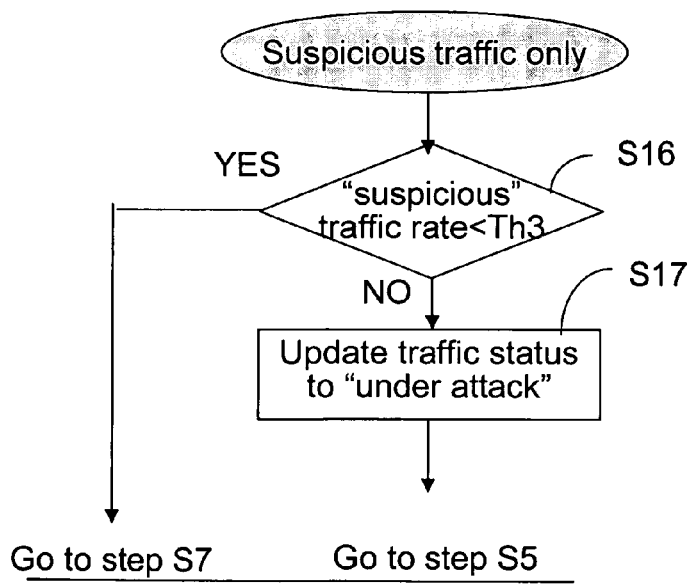

FIGS. 3a and 3b are flowcharts illustrating the two stages for evaluating the service status of the traffic flows. FIG. 3a illustrates the first stage, where monitor 25 characterizes each service as "suspicious" or not, step S11. In step S12 the monitor triggers the early notification 13 to service status unit 14, if the traffic is suspicious, branch "YES" of decision block S11. As indicated above, during this stage, monitor 25 uses a different threshold for each traffic class, since the integrity characteristics of the traffic differ with the type of service and level of risk. Then the service status unit 14 updates the status table accordingly, as shown in step S13. The suspicious traffic as well as the remainder of the traffic is then routed by discriminator 18 to the output, step S7 of the flowchart of FIG. 2.

The mitigating action may be one of: discarding the under attack traffic flow altogether; rate limiting the rate of the under attack traffic flow; rate limiting packets in the under attack traffic flow matching an attack signature; and rate limiting packets in the under attack traffic found via packet inspection.

FIG. 3b illustrates the second stage, where the monitoring system characterizes only the suspicious service as under attack or not, by monitoring the rate of the respective service. A higher than the threshold traffic rate in a "suspicious" traffic flow indicates that the respective service is indeed under attack, as shown by branch "NO" of decision block S16. In this case, the service status unit 14 updates accordingly the status table, step S17. The traffic at the output of the traffic rate monitor 16 is returned to the input of discriminator 18, which performs routing according to the traffic service state, step S5 of the flowchart of FIG. 2. If the rate of the suspicious traffic is under the threshold, branch "YES" of decision block S16, the respective service is routed to the output, as shown by step S7 in FIG. 2.

We claim:

1. A method of detecting abnormal traffic at a node of a communications network equipped with an intrusion detection/prevention system (IDS/IPS), the method comprising:
   monitoring the status of a traffic flow input to said node to establish when said traffic flow carries suspicious data traffic, by looking only at a subset of data traffic in said traffic flow, wherein the step of monitoring comprises:
   assigning a risk class from a plurality of risk classes to said traffic flow based on vulnerabilities recognized for a protocol used by said traffic flow, the plurality of risk classes including an "at risk" class or a "not at risk" class,
   measuring a rate of the subset of data traffic in said traffic flow, and
   comparing the rate of said subset of data traffic to a first threshold if said traffic flow belongs to the "at risk" class,
   comparing the rate of said subset of data traffic to a second threshold if said traffic flow belongs to the "not at risk" class, wherein the first threshold is lower than the second threshold,
   flagging said traffic flow as a suspicious traffic flow when the rate of the subset of data traffic is above a respective one of said first and second thresholds; and
   triggering an early notification once the status of said traffic flow is flagged as a suspicious traffic flow.

2. The method of claim 1, further comprising:
   further monitoring the status of said suspicious traffic flow by looking at a specified parameter of said suspicious traffic flow to determine when said suspicious traffic flow is an under attack traffic flow;
   updating the status of said suspicious traffic flow from suspicious to under attack, and flagging said suspicious traffic flow as an under attack traffic flow; and
   sending said under attack traffic flow to the IDS/IPS to perform a mitigating action.

3. The method of claim 1, wherein said subset of data traffic includes a plurality of Internet Control Message Protocol (ICMP) packets in said traffic flow.

4. The method of claim 2 wherein said specified parameter is the rate of said suspicious traffic flow.

5. The method of claim 4, wherein said step of further monitoring comprises:
   measuring the rate of said suspicious traffic flow; and
   comparing the rate of said suspicious traffic flow with a further threshold for establishing if the status of said suspicious traffic flow is "under attack".

6. For a network node of a communication network equipped with an intrusion detection/prevention system (IDS/IPS), a method of detecting abnormal traffic, the method comprising:
   maintaining a service status table with a status for a traffic flow input to said network node;
   classifying said traffic flow into a risk class based on vulnerabilities recognized for a protocol used by said traffic flow, the risk class being either an "at risk" class or a "not at risk" class;
   evaluating the status of said traffic flow as "suspicious" or "non-suspicious" based on the risk class assigned to said traffic flow, wherein the step of evaluating comprises:
   separating Internet Control Message Protocol (ICMP) packets from said traffic flow,
   rate monitoring said ICMP packets,
   comparing the rate of said ICMP packets to a first threshold if said traffic flow belongs to the "at risk" class,
   comparing the rate of said ICMP packets to a second threshold if said traffic flow belongs to the "not at risk" class, wherein the first threshold is lower than the second threshold, and
   determining that said traffic flow is "suspicious" when the rate of said ICMP packets exceeds a respective one of said first and second thresholds;
   updating said service status table whenever the status of said traffic flow changes from a "non-suspicious" state to a "suspicious" state and flagging said traffic flow as a suspicious traffic flow;
   further evaluating the status of said suspicious traffic flow to identify an "under attack" status or a "not under attack" status;
   further updating the status of said suspicious traffic flow to an "under attack" status, and flagging said suspicious traffic flow as an under attack traffic flow; and
   routing said under attack traffic flow to said IDS/IPS.

7. The method of claim 6, wherein the step of evaluating further comprises generating an early traffic status notifier whenever said ICMP rate exceeds a respective one of said first and second thresholds.

8. The method of claim 6, wherein the step of further evaluating comprises:
   measuring the rate of said suspicious traffic flow;
   comparing the rate of said suspicious traffic flow against a third threshold; and
   generating an under attack traffic notifier whenever the rate of said suspicious traffic flow exceeds said third threshold.

9. The method of claim 8, wherein said third threshold is selected according to a transmission protocol used by said traffic flow.

10. The method of claim 6, wherein said step of routing comprises identifying a type of attack and, based on the type of attack, performing a mitigating action on said traffic flow.

11. The method of claim 10, wherein the mitigating action is one of:
   discarding said under attack traffic flow altogether,
   rate limiting the rate of said under attack traffic flow,
   rate limiting packets in said under attack traffic flow matching an attack signature, and
   rate limiting packets in said under attack traffic flow found via packet inspection.

12. A system for abnormal traffic detection with early notification (ATDEN) comprising:
   maintaining a service status table with a service status for a traffic flow input to a communication node;
   classifying said traffic flow into a risk class based on vulnerabilities recognized for a protocol used by said traffic flow, the risk class being either an "at risk" class or a "not at risk" class;
   a monitor that evaluates the status of said traffic flow and updating said service status table whenever the status of the traffic flow changes, wherein the monitor comprises:
      separating Internet Control Message Protocol (ICMP) packets from said traffic flow,
      an ICMP rate monitor that monitors said ICMP packets, wherein said ICMP rate monitor:
      comparing the rate of said ICMP packets against a first threshold for said "at risk" class and against a second threshold for said "not at risk" class, and
      determines that said traffic flow is "suspicious" when the rate of said ICMP packets exceeds a respective one of said first and second thresholds; and
   a traffic discriminator that routes said traffic flow to an output of said system, to said monitor if said traffic flow has a "suspicious" state and to an intrusion detection/prevention system (IDS/IPS) to perform a mitigating action, if said traffic flow has an "under attack" status.

13. The system of claim 12, wherein said monitor further comprises a traffic rate monitor that measures the rate of said traffic flow against a third threshold, and generating an "under attack" notifier whenever the rate of said traffic flow exceeds said third threshold.

* * * * *